United States Patent [19]

Nicholls et al.

[11] 3,845,782

[45] Nov. 5, 1974

[54] FLOW CONTROL VALVE FOR HYDRAULIC DAMPER AND THE LIKE

[75] Inventors: Lawrence George Nicholls; David William Gee, both of Tyseley, England

[73] Assignee: Girling Limited, Birmingham, England

[22] Filed: July 23, 1973

[21] Appl. No.: 381,540

Related U.S. Application Data

[63] Continuation of Ser. No. 206,641, Dec. 10, 1971, abandoned.

[30] Foreign Application Priority Data

Dec. 14, 1970 Great Britain.................... 59376/70

[52] U.S. Cl.......... 137/493, 137/493.8, 137/512.15, 137/516.15, 188/317
[51] Int. Cl........................................... F16k 15/08
[58] Field of Search............. 137/493, 493.8, 493.9, 137/512.15, 512.4, 516.11, 516.13, 516.15, 516.17, 516.19, 516.21, 516.23; 188/282, 317

[56] References Cited

UNITED STATES PATENTS

| 3,199,636 | 8/1965 | De Carbon | 188/317 |
| 3,312,312 | 4/1967 | De Carbon | 188/317 |
| 3,380,560 | 4/1968 | Katz | 137/493.8 X |
| 3,430,648 | 3/1969 | Botkin | 137/493 |
| 3,516,520 | 6/1970 | Agren et al. | 188/282 |
| 3,747,714 | 7/1973 | De Carbon | 188/317 |

FOREIGN PATENTS OR APPLICATIONS

| 883,321 | 11/1961 | Great Britain | |
| 918,083 | 2/1963 | Great Britain | |
| 1,046,432 | 10/1966 | Great Britain | |
| 1,100,451 | 1/1968 | Great Britain | |
| 1,103,464 | 2/1968 | Great Britain | |
| 1,065,526 | 5/1954 | France | |
| 642,815 | 3/1937 | Germany | |
| 1,242,056 | 1/1964 | Germany | |
| 1,376,487 | 9/1964 | France | 137/493 |
| 1,000,398 | 8/1965 | Great Britain | 137/493 |

Primary Examiner—William R. Cline
Attorney, Agent, or Firm—Scrivener Parker Scrivener and Clarke

[57] ABSTRACT

A flow control valve, particularly for the piston of a telescopic hydraulic damper unit, has a flexible annular valve member located over a central guide member and normally engages two oppositely directed inner and outer valve seats. Axial recesses in the guide member form flow passages when the inner periphery of the valve lifts off the inner valve seat, the main characterizing feature of the invention being that the cross-sectional flow area of the flow passages is always at least as great as that of the entrance to the passages on the upstream side, the size of the entrances therefore dominating flow characteristics.

8 Claims, 5 Drawing Figures

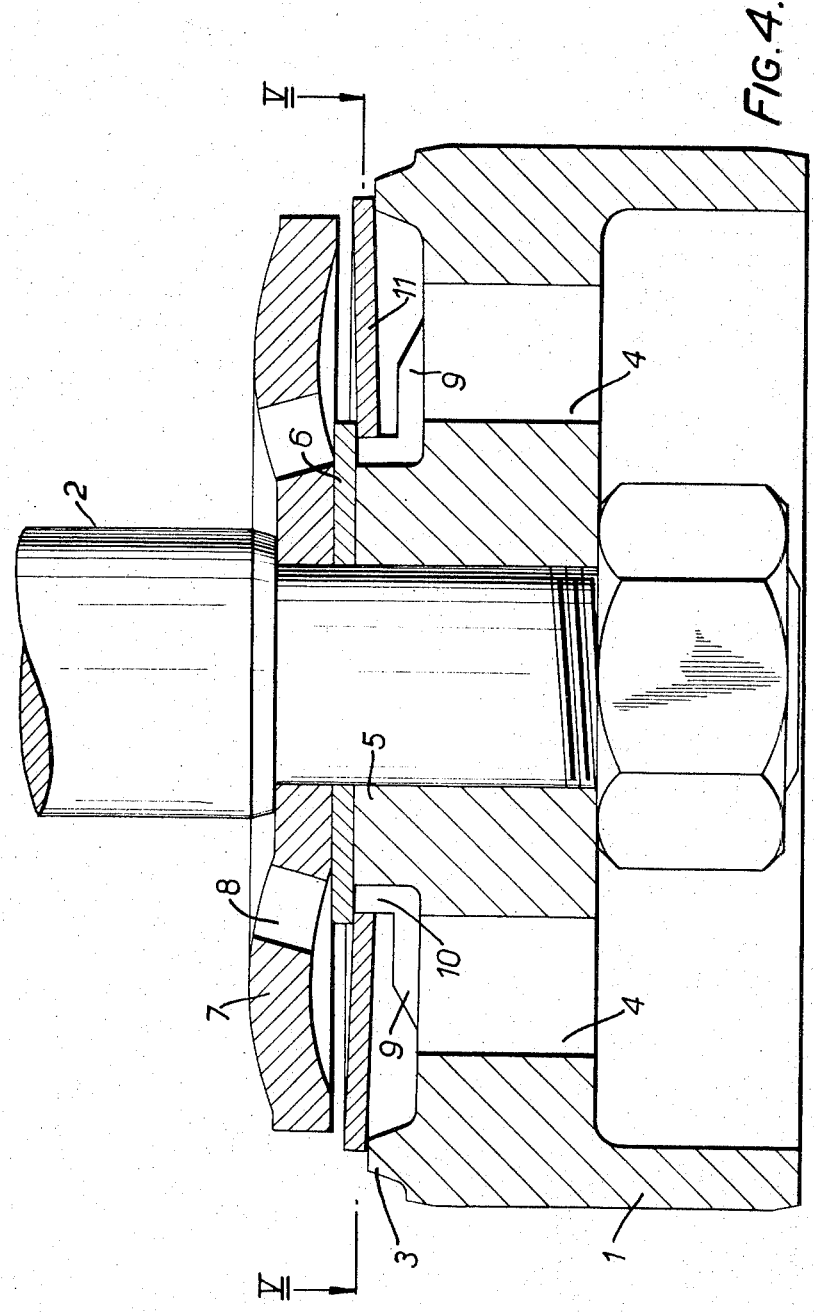

3,845,782

FLOW CONTROL VALVE FOR HYDRAULIC DAMPER AND THE LIKE

This is a continuation of application Ser. No. 206,641 filed Dec. 10, 1971, now abandoned.

This invention reltes to fluid flow control valves of the form comprising a flexible annular valve member normally engaged with respective annular, oppositely directed valve seats adjacent its inner and outer peripheries and displaceable from one seat or the other, by a pressure difference acting on the member, and a central guide member extending from the inner valve seat through the annular valve member and having axially extending recesses in its outer periphery forming flow passages for the flow of liquid through the valve when the valve member is displaced from its inner seat. Such a valve construction is hereinafter referred to for convenience as being "of the construction described."

Flow control valves of the construction described may, for example, be employed as piston valves for the pistons of telescopic hydraulic dampers, for controlling flow through the piston, permitting relatively free flow in one direction (when the outer periphery of the valve member is displaced from its seat) and restricted flow in the opposite direction.

In previously proposed valves of the construction described, the dominant factor in determining operating characteristics of the valve has been the restricted flow area presented by the cross-section of the flow passages, which is independent of valve member displacement.

In accordance with the present invention, however, the cross-sectional area of each of the guide member flow passages is at least as great as the entrance to the passages from the upstream side of the valve, for all positions of the valve member.

With this arrangement the only orifices effectively restricting flow are the entrances to the flow passage, and this facilitates precise design of the operating characteristics of the valve, and the flow through the flow passages will be a generally linear function of the axial displacement of the inner valve periphery, which is in turn proportional to the pressure difference acting across the valve member.

Preferably, axial travel of the valve member inner periphery is limited by a stop spaced from the valve seat, the stop taking the general form of an outwardly directed flange having recesses aligned with the flow passages to form continuations thereof, and the axial extent of the flange (and thus of the recesses therein) is at least equal to the maximum axial travel of the valve member inner periphery, to ensure that the flange recesses do not impose any additional restriction on flow through the flow passages.

In one embodiment the flange is formed as an integral part of the central guide member, and in another the guide member is formed integrally with a damper piston, on the crown thereof, so that the body of the piston effectively constitutes the flange.

Preferably, the inner valve seat is formed as a separate member overlying and secured to the guide member, this arrangement permitting a very simple design and assembly of the valve unit, and it also allows for the possibility of making the valve seat of a suitably hard material and the guide member of a different material, such as a moulded synthetic plastics material.

Two forms of flow control valve for the piston of a telescopic hydraulic damper will now be described, by way of example only, with reference to the accompanying drawings, in which:

FIG. 4 is an axial section of a modified valve and piston taken on the line 4—4 of FIG. 5.

Figure 1:
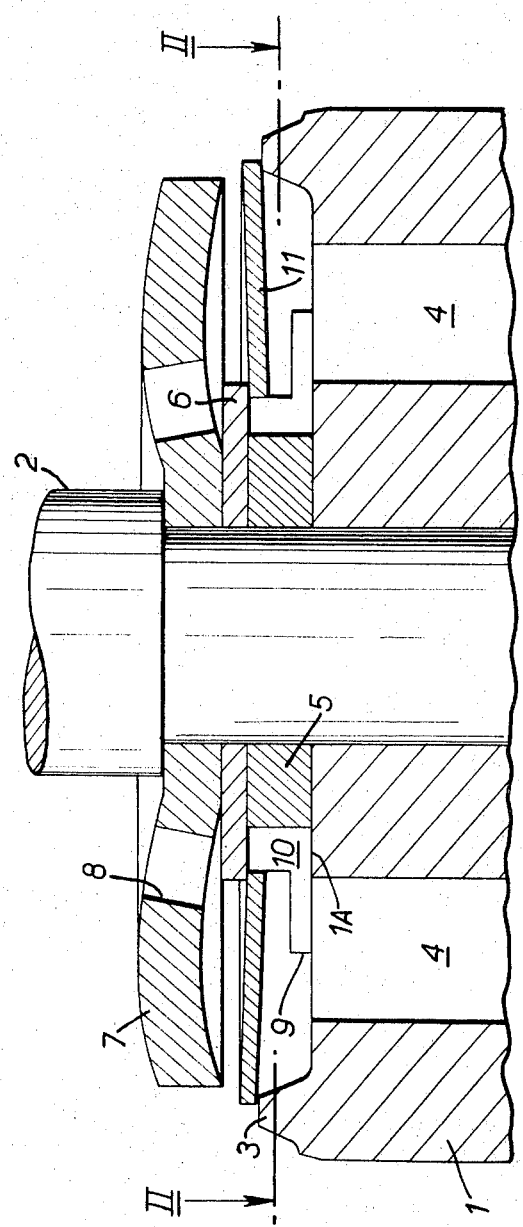
FIG. 1 is an axial section of one valve and piston.
Figure 2:
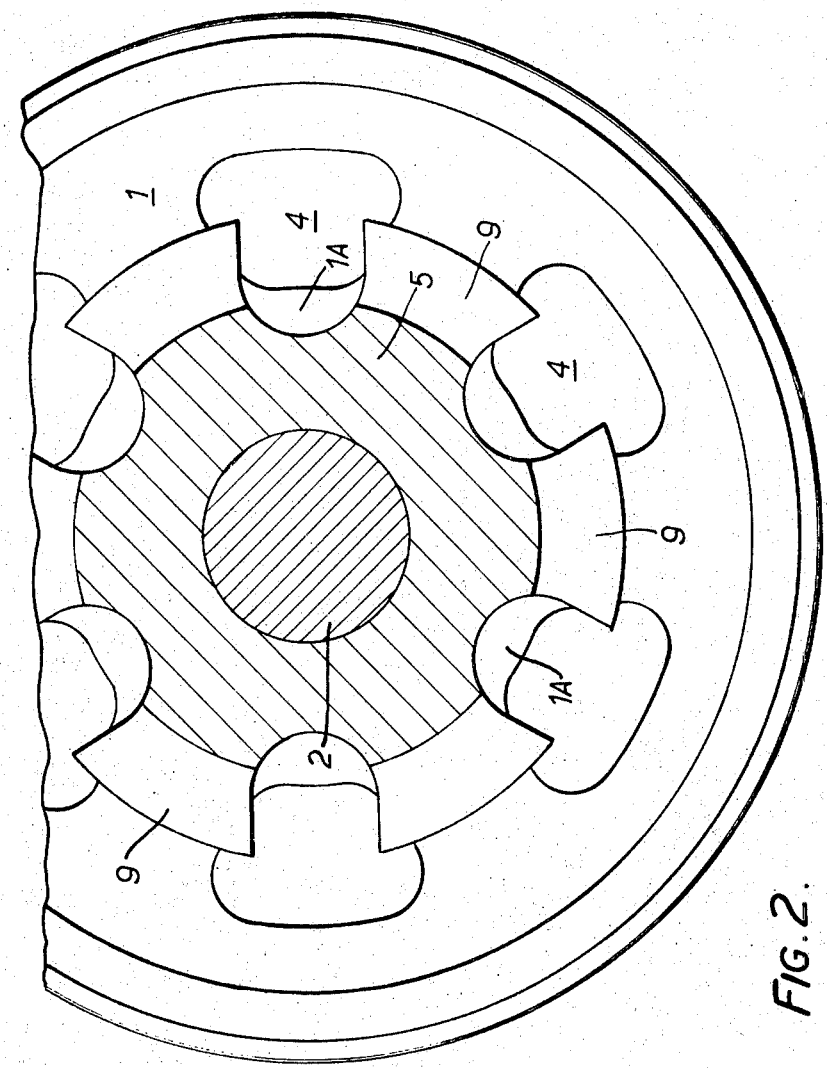
FIG. 2 is a section on the line II—II of FIG. 1.

The first valve is shown in FIGS. 1 and 2 assembled with a piston 1 and piston rod 2 of a damper. The piston is formed with an outer, annular valve seat 3 upstanding from the otherwise flat crown of the piston, and with a number of large through bores 4. Clamped between the piston and a shoulder on the piston rod is a three-part assembly consisting of a central guide member 5, an inner valve seat 6 and an upper limit stop 7 having a number of large holes 8 for the unimpeded flow of liquid therethrough. The guide member 5 has at its lower end an outwardly projecting integral flange 9 and is formed in its periphery with a number of axially extending recesses 10 forming flow passages. These recesses continue without discontinuity through the full axial thickness of the guide member 5 and its flange 9.

A flexible annular valve member 11 is closely guided over the stem of the guide member, with only working clearance and is engaged at its respective inner and outer peripheries by the oppositely directed valve seats 6 and 3. The valve member is assembled with a small pre-load so that it normally engages both seats, as shown.

Fluid flow through the piston in one direction, upwardly through the bores 4, is readily accommodated by flexure of the valve member about its inner periphery, the outer periphery being displaced from the seat 3 to allow relatively unimpeded flow throughout the circumference of the valve seat and valve member.

Flow in the opposite direction takes place when the upper surface of the valve member experiences an over pressure, which causes the valve member to flex about its outer periphery, allowing the inner periphery to leave the inner seat 6. This displacement opens up a slot-like entrance at each of the recesses 10, for the flow of fluid into the recesses, past the inner edge of the valve member to the lower pressure or downstream side thereof. Axial flow through the recesses encounters the upper face 1A of the piston 1 which thereby assures a deflection of flow in the radial direction before fluid reaches the large piston holes 4. It is thought that this deflection of the flow assists in eliminating localised hot spots and "whistling" of the valve in operation.

The cross-sectional areas of the recesses 10 are deliberately made sufficiently large that they are always at least as great as the areas of the slot-like entrances formed on the upstream side of the valve member, so that the size of the slot-like entrances (in turn dependent on axial deflection of the valve member) is the controlling factor in restricting flow through the valve. To ensure that no greater restriction is imposed at the exits from the recesses 10, the axial thickness of the flange 9 is made as great as the maximum valve member deflection, so that in the limiting case, engagement of the valve member with the upper surface of the flange does not impose a further restriction on flow. This limitation on valve member flexure is, of course, useful in preventing overworking of the member.

Figure 3:
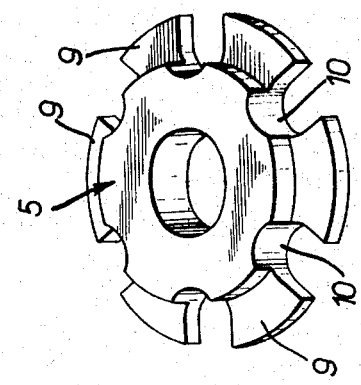
FIG. 3 is a perspective view on a reduced scale of the guide member of the valve of FIGS. 1 and 2.
Figure 5:
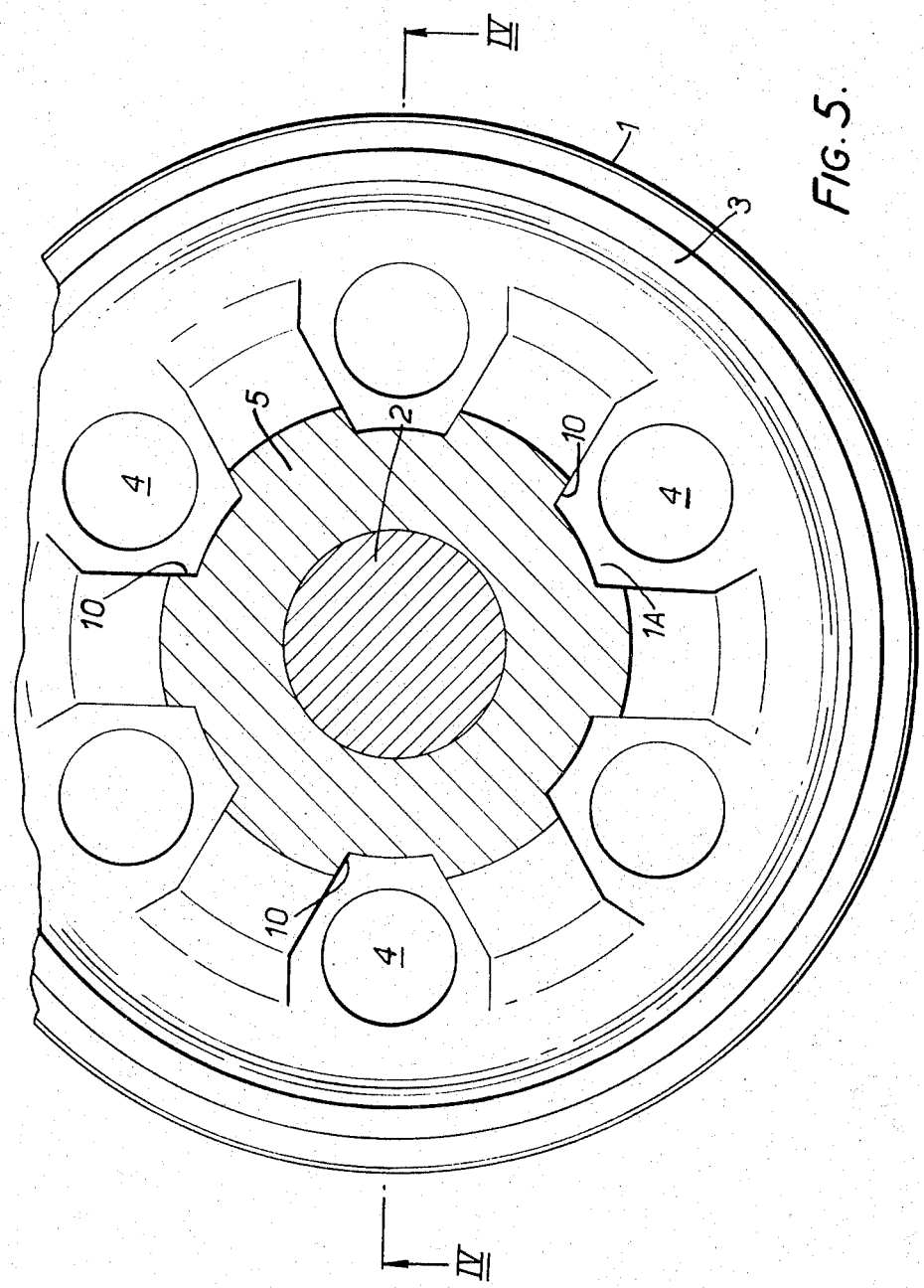
FIG. 5 is a section on the line V—V of FIG. 4.

The valve shown in FIGS. 4 and 5 is very similar in its construction and operation to that of FIGS. 1 to 3. For convenience, the same reference numerals are employed to identify corresponding parts of the two embodiments.

The main difference resides in that the central guide member 5 and flange 9 are formed integrally with the piston 1.

We claim:

1. A fluid flow control valve comprising a pair of oppositely directed annular valve seats, a flexible annular valve having an inner periphery normally engaged with one said valve seat and an outer periphery normally engaged with the second said valve seat, said valve member being capable of flexing to lift off one or the other of said valve seats according to the direction of an axially applied pressure; a central guide member extending through said annular valve member, said guide member having means defining axially extending recesses in its outer periphery to form flow passages for the flow of fluid through said valve when said valve member is displaced from said one valve seat, and wherein each of said passages has a cross-sectional area at least as great as the area of the radial entrance thereto at the upstream side of said valve in all operational positions of said valve member, and an outwardly projecting annular flange spaced from said one valve seat to form a stop for said inner periphery of said valve member in a fully open condition thereof, said flange having recesses formed therein as a continuation of said passages and having an axial extent at least as great as the maximum axial travel of said inner periphery of said valve member.

2. A valve as claimed in claim 1 including deflector surface means positioned at the downstream end of each of said flow passages to deflect radially the fluid flowing through said passages in use.

3. A valve is claimed in claim 1 wherein said flange is integral with said guide member.

4. A valve as claimed in claim 3 wherein said one valve seat is formed as a separate member overlying and secured to said guide member.

5. A valve member as claimed in claim 3 wherein said guide member is integral with a piston for a telescopic hydraulic damper unit.

6. A fluid flow control valve comprising a pair of oppositely directed annular valve seats, a flexible annular valve element having an inner periphery normally engaged with one said valve seat and an outer periphery normally engaged with the second said valve seat, said valve element being capable of flexing to lift off one or the other of said valve seats according to the direction of an axially applied pressure; a stop axially spaced from said one valve seat and engageable by the inner periphery of said valve element when in its fully open position; central guide means between said one valve seat and said stop, and extending through said annular valve element; and flow passage means in said guide means extending from said one valve seat past said stop for the flow of fluid through said valve when the inner periphery of said valve element is displaced from said one valve seat, the cross-sectional area of said passage means throughout the extent thereof being at least as great as the area of the radial entrance thereto at the upstream side of said valve in all operational positions of said valve element whereby throttling of fluid flow past the inner periphery of said valve element is controlled solely by the radial opening exposed by axial deflection of the inner periphery of said valve element away from said one valve seat.

7. A fluid flow control valve comprising a pair of oppositely directed annular valve seats, a flexible annular valve element having an inner periphery normally engaged with one said valve seat and an outer periphery normally engaged with the second said valve seat, said valve element being capable of flexing to lift off one or the other of said valve seats according to the direction of an axially applied pressure; a stop axially spaced from said one valve seat and engageable by the inner periphery of said valve element when in its fully open position; central guide means between said one valve seat and said stop, and extending through said annular valve element; flow passages in said guide means extending between said stop and said one valve seat, and outlet ducts through said stop, one each aligned respectively with each flow passage in said guide means, the cross-sectional area of said passages and ducts throughout the extent thereof being at least as great as the area of the radial entrance thereto at the upstream side of the valve in all operational position of said valve element whereby throttling of fluid flow past the inner periphery of said valve element is controlled solely by the radial opening exposed by axial deflection of the inner periphery of said valve element away from said one valve seat.

8. A fluid flow control valve comprising a pair of oppositely directed annular valve seats, a flexible annular valve element having an inner periphery normally engaged with one said valve seat and an outer periphery normally engaged with the second said valve seat, said valve element being capable of flexing to lift off one or the other of said valve seats according to the direction of an axially applied pressure; a stop axially spaced from said one valve seat and engageable by the inner periphery of said valve element when in its fully open position; central guide means between said one valve seat and said stop, and extending through said annular valve element; flow passage means in said guide means extending from said one valve seat past said stop for the flow of fluid through said valve when the inner periphery of said valve element is displaced from said one valve seat, the cross-sectional area of said passage means throughout the extent thereof being at least as great as the area of the radial entrance thereto at the upstream side of said valve in all operational positions of said valve element whereby throttling of fluid flow past the inner periphery of said valve element is controlled solely by the radial opening exposed by axial deflection of the inner periphery of said valve element away from said one valve seat and a second annular stop axially spaced from said second valve seat and engageable by the outer periphery of said valve element to provide an uninterrupted annular fluid passage between said second valve seat and said outer periphery when the latter is flexed away from said second valve seat.

\* \* \* \* \*